(12) United States Patent
Kim

(10) Patent No.: US 10,338,730 B2
(45) Date of Patent: Jul. 2, 2019

(54) DISPLAY DEVICE AND TIMING CONTROLLER

(71) Applicant: LG Display Co., Ltd., Seoul (KR)

(72) Inventor: SeYoung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/385,156

(22) Filed: Dec. 20, 2016

(65) Prior Publication Data

US 2017/0192592 A1   Jul. 6, 2017

(30) Foreign Application Priority Data

Dec. 31, 2015  (KR) .................... 10-2015-0191141

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0412* (2013.01); *G09G 3/3233* (2013.01); *G09G 3/3291* (2013.01); *G06F 2203/04108* (2013.01); *G09G 2300/0819* (2013.01); *G09G 2300/0842* (2013.01);
(Continued)

(58) Field of Classification Search
CPC ........ G06F 3/0416; G06F 3/041; G06F 3/044; G06F 3/0412; G06F 2203/04108; G06F 2203/04; G09G 3/3291; G09G 2310/08; G09G 3/3233; G09G 2300/0819; G09G 2300/0842; G09G 2320/0295; G09G 2320/045; G09G 2354/00
See application file for complete search history.

(56) References Cited

U.S. PATENT DOCUMENTS

| | | | | |
|---|---|---|---|---|
| 2008/0224962 A1* | 9/2008 | Kasai | .................... | G06F 3/0412 345/76 |
| 2010/0045630 A1* | 2/2010 | Gu | ......................... | G06F 3/0412 345/174 |

(Continued)

FOREIGN PATENT DOCUMENTS

| | | |
|---|---|---|
| CN | 101266528 A | 9/2008 |
| CN | 101364160 A | 2/2009 |

(Continued)

OTHER PUBLICATIONS

European Search Report issued in European Patent Application No. 16206661.7 dated May 9, 2017.
(Continued)

*Primary Examiner* — Md Saiful A Siddiqui
(74) *Attorney, Agent, or Firm* — Polsinelli PC

(57) ABSTRACT

The present disclosure relates to a display device and a timing controller. The display device includes a panel on which a number of subpixels are disposed and a characteristic sensing circuit sensing characteristic values of the number of subpixels. When a difference between the characteristic value of a specific subpixel among the number of subpixels and a reference value exceeds a predetermined range, the characteristic sensing circuit generates coordinate data of the specific subpixel. The display device includes a host controller recognizing a user manipulation based on the coordinate data.

17 Claims, 12 Drawing Sheets

(51) Int. Cl.
*G09G 3/3291* (2016.01)
*G09G 3/3233* (2016.01)

(52) U.S. Cl.
CPC . *G09G 2310/08* (2013.01); *G09G 2320/0295* (2013.01); *G09G 2320/045* (2013.01); *G09G 2354/00* (2013.01)

(56) References Cited

U.S. PATENT DOCUMENTS

| | | | | |
|---|---|---|---|---|
| 2013/0069895 | A1* | 3/2013 | Lo | G06F 3/0416 345/173 |
| 2013/0208152 | A1* | 8/2013 | Hsu | H04N 5/367 348/246 |
| 2014/0022289 | A1* | 1/2014 | Lee | G09G 3/3283 345/691 |
| 2014/0160045 | A1* | 6/2014 | Park | G06F 3/0488 345/173 |
| 2014/0176409 | A1* | 6/2014 | Kim | G09G 3/3233 345/92 |
| 2014/0176525 | A1* | 6/2014 | Woo | G09G 3/3233 345/212 |
| 2015/0049075 | A1 | 2/2015 | Lim et al. | |
| 2016/0104422 | A1* | 4/2016 | Kishi | G09G 3/3233 345/205 |
| 2016/0124491 | A1* | 5/2016 | An | G06F 1/3265 713/323 |

FOREIGN PATENT DOCUMENTS

| | | |
|---|---|---|
| CN | 102999212 A | 3/2013 |
| CN | 103578411 A | 2/2014 |
| CN | 103841397 A | 6/2014 |
| CN | 103870028 A | 6/2014 |
| TW | 201017306 A | 5/2010 |

OTHER PUBLICATIONS

Office Action with English translation dated Sep. 4, 2018 issued in the corresponding Chinese Patent Application No. 201611167123.X, 22 Pages.

Office Action dated Apr. 1, 2019 issued in the corresponding Chinese Patent Application No. 201611167123.X, pp. 1-13.

* cited by examiner

Mobility Sensing

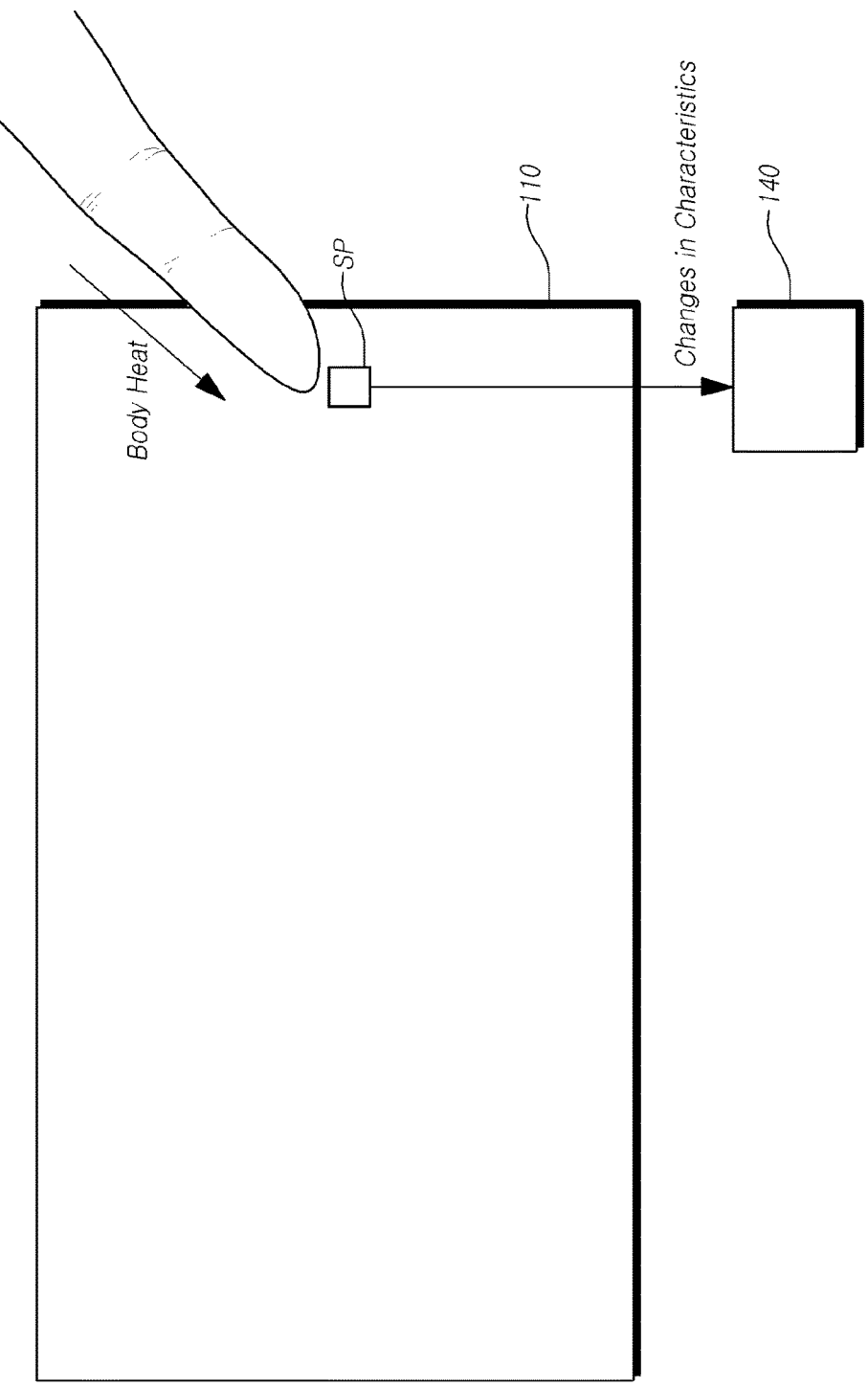

DISPLAY DEVICE AND TIMING CONTROLLER

CROSS-REFERENCE TO RELATED APPLICATION

This application claims the priority from Korean Patent Application No. 10-2015-0191141 filed in the Republic of Korea on Dec. 31, 2015, which is hereby incorporated by reference in its entirety for all purposes as if fully set forth herein.

BACKGROUND

Field of the Disclosure

The present disclosure relates to a display device, and more particularly, to a display device and a timing controller. Although the present disclosure is suitable for a wide scope of applications, it is particularly suitable for detecting a user touch interaction without using a touch panel in the display device.

Description of the Background

In response to the development of the information society, a demand for a variety of display devices for displaying images is increasing. In this regard, a range of display devices, such as liquid crystal display (LCD) devices, plasma display panels (PDPs), and organic light-emitting display devices, have recently come into widespread use.

A display device commonly includes a display panel and a support structure supporting the display panel.

In general, the support structure supports the display panel while surrounding the rear surface and the side surfaces of the display panel. Recently, the thickness of the area of the support structure located at the edges of the display panel has been gradually decreased. The area of the support structure located at the edges of the display panel is also referred to as a border area, a bezel area, a non-display area, or the like. This area has been gradually decreasing.

In conventional display devices, user control buttons are disposed in such areas located at the edges of display panels. For example, a power button, a channel button (or home button), a volume button, and so on are disposed in such areas.

Recently, it has become more difficult to dispose such user control buttons in such areas, since the size of this area has been gradually decreasing.

When such a display device includes a touch panel, the display device can sense a user manipulation (e.g. a user touch interaction) using the touch panel. However, due to decreases in the side area as described above, it is more difficult to dispose user control buttons on display devices that are not provided with touch panels in consideration of cost.

SUMMARY

Accordingly, the present disclosure is directed to a display device and a timing controller that substantially obviate one or more problems due to limitations and disadvantages of the prior art.

Additional features and advantages of the disclosure will be set forth in the description which follows and in part will be apparent from the description, or may be learned by practice of the disclosure. The objectives and other advantages of the disclosure will be realized and attained by the structure particularly pointed out in the written description and claims hereof as well as the appended drawings.

Various aspects of the present disclosure provide a technology able to detect a user manipulation (e.g. a user touch interaction) in place of using a user control button physically disposed on a display device. Also provided is a technology able to detect a touch made by a user to a display panel without including a touch panel. Also provided is a technology able to recognize a touch made by a user to a display panel as a user manipulation.

According to an aspect of the present disclosure, a display device may include: a panel on which a number of subpixels are disposed; a characteristic sensing circuit sensing characteristic values of the number of subpixels, and when a difference between the characteristic value of a specific subpixel among the number of subpixels and a reference value exceeds a predetermined range, generating coordinate data of the specific subpixel; and a host controller recognizing a user manipulation based on the coordinate data.

According to another aspect of the present disclosure, a display device may include a panel, a data driver circuit, a timing controller, and a host controller. In the display device, a number of subpixels, a number of data lines, and a number of sensing lines are disposed on the panel. The data driver circuit supplies data voltages to the number of subpixels through the number of data lines and receiving characteristic sensing signals from the number of subpixels through the number of sensing lines. In addition, the timing controller controls the data driver circuit using timing signals. The timing controller compares characteristic values of the number of subpixels corresponding to the characteristic sensing signals with a predetermined reference value, and when a difference between the characteristic value of a specific subpixel among the number of subpixels and a reference value exceeds a predetermined range, generates coordinate data for the specific subpixel. In addition, the host controller recognizes a user manipulation based on the coordinate data.

According to a further aspect of the present disclosure, a timing controller may include a driver controller, a coordinate data generator, and a communications circuit. In the timing controller, the driver controller controls a data driver circuit by transmitting timing signals to the data driver circuit. The data driver circuit supplies data voltages to a number of subpixels through a number of data lines and receives characteristic sensing signals from the number of subpixels through a number of sensing lines. The coordinate data generator compares characteristic values of the number of subpixels corresponding to the characteristic sensing signals with a predetermined reference value, and when a difference between the characteristic value of a specific subpixel among the number of subpixels and the reference value exceeds a predetermined range, generates coordinate data for the specific subpixel. The communications circuit receives the characteristic sensing signals from the data driver circuit and transmits the coordinate data to a host controller circuit.

According to the present disclosure as set forth above, it is possible to detect a user manipulation using a touch made by a user to a display panel in place of using a user control button physically disposed on a display device. In addition, according to the present disclosure, it is possible to detect a touch made by a user to a display panel without including a touch panel.

It is to be understood that both the foregoing general description and the following detailed description are exemplary and explanatory and are intended to provide further explanation of the disclosure as claimed.

BRIEF DESCRIPTION OF THE DRAWINGS

The above and other objects, features and advantages of the present disclosure will be more clearly understood from the following detailed description when taken in conjunction with the accompanying drawings, in which:

FIG. 4 is a schematic view illustrating amounts of change in the characteristics of subpixels in response to a touch made by a user;

DETAILED DESCRIPTION

Figure 1:
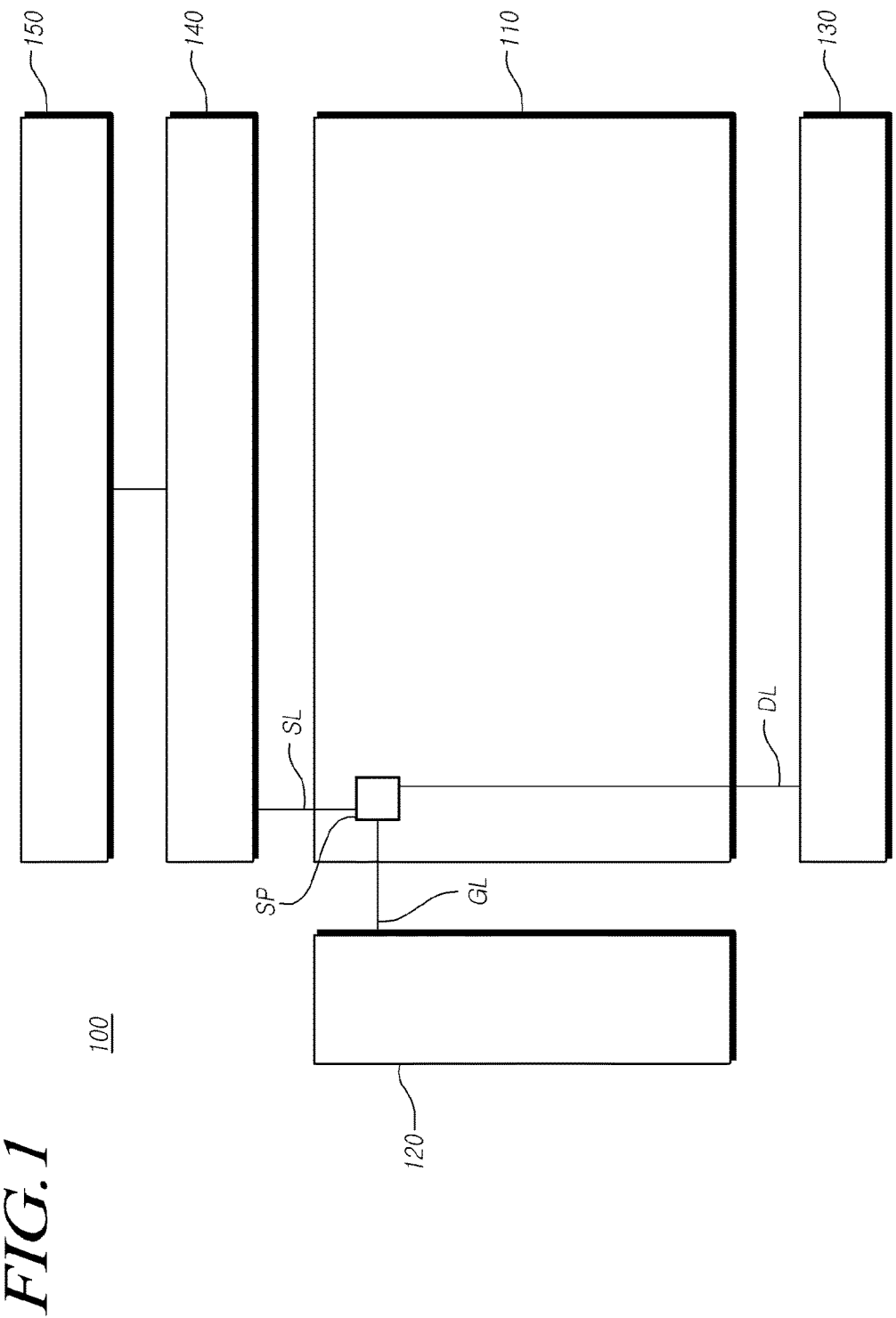
FIG. 1 is a configuration view illustrating a display device according to an aspect of the present disclosure.

Hereinafter, reference will be made to aspects of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a configuration view illustrating a display device according to an aspect of the present disclosure.

Referring to FIG. 1, a display device 100 includes a panel 110, a gate driver circuit 120, a data driver circuit 130, a characteristic sensing circuit 140, and a host controller 150.

A plurality of data lines DL, a plurality of gate lines GL, and a plurality of sensing lines SL are disposed on the panel 110, defining a plurality of subpixels SP on the panel 110.

The gate driver circuit 120 can supply scanning signals of turn-on or turn-off voltages to the gate lines GL. When the scanning signals of turn-on voltages are supplied to the subpixels SP, the subpixels SP are connected to the corresponding data lines DL. When the scanning signals of turn-off voltages are supplied to the subpixels SP, the subpixels SP are disconnected from the data lines DL.

The data driver circuit 130 supplies data voltages to the data lines DL. The data voltages supplied to the data lines DL are supplied to the subpixels SP connected to the data lines DL, in response to scanning signals.

The host controller 150 generates image data, and the data driver circuit 130 receives the image data and converts the image data into data voltages. In addition, the data driver circuit 130 supplies the converted data voltages to the data lines DL.

The characteristic sensing circuit 140 senses characteristic values or amounts of change in characteristics regarding the subpixels SP based on characteristic sensing signals received from the sensing lines SL.

In addition, the characteristic sensing circuit 140 generates coordinate data for subpixels, a difference between the characteristic values of which and a reference value exceeds a predetermined range, and transmits the coordinate data to the host controller 150.

The host controller 150 generates image data and controls the display device 100 in response to a user manipulation (e.g. a user touch interaction).

The host controller 150 uses coordinate data received from the characteristic sensing circuit 140 to detect the user manipulation.

The coordinate data includes coordinate values corresponding to a portion on the panel 110 touched by the user. The host controller 150 detects the user manipulation by recognizing the portion on the panel 110 touched by the user based on the coordinate values.

Figure 2:
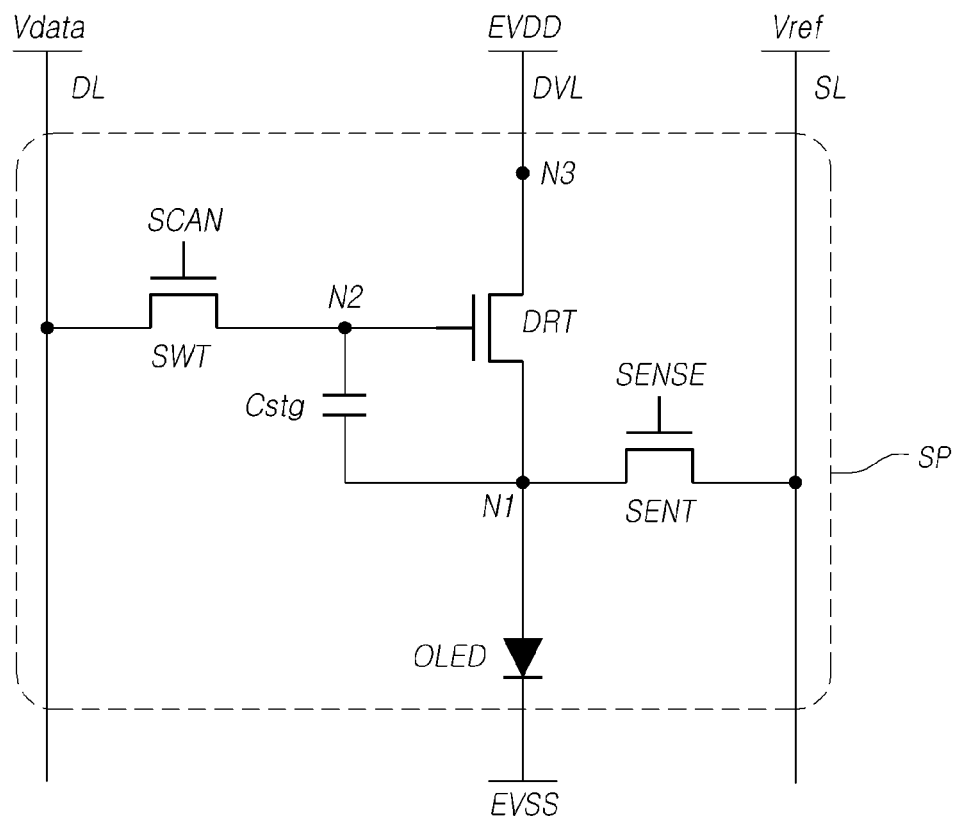
FIG. 2 is a circuit diagram illustrating an internal structure of each of the subpixels illustrated in FIG. 1.

FIG. 2 is a circuit diagram illustrating an internal structure of each of the subpixels illustrated in FIG. 1.

Referring to FIG. 2, the subpixel SP includes an organic light-emitting diode (OLED), a driving transistor DRT driving the OLED, a switching transistor SWT delivering a data voltage to a second node N2 corresponding to the gate node of the driving transistor DRT, and a storage capacitor Cstg maintaining the data voltage for a period of a single frame.

The OLED includes a first electrode (e.g. an anode or a cathode), an organic layer, a second electrode (e.g. a cathode or an anode), or the like.

The driving transistor DRT drives the OLED by supplying a driving current thereto.

A first node N1 of the driving transistor DRT is electrically connected to the first electrode of the OLED, and may be a source node or a drain node. A second node N2 of the driving transistor DRT is electrically connected to a source node or a drain node of the switching transistor SWT, and may be a gate node of the driving transistor DRT. A third node N3 of the driving transistor DRT is electrically connected to a driving voltage line DVL through which a driving voltage EVDD is supplied, and may be a drain node or a source node.

As illustrated in FIG. 2, the driving transistor DRT and the switching transistor SWT may be n-type transistors or p-type transistors.

The switching transistor SWT is electrically connected between a data line DL and the second node N2 of the driving transistor DRT, and is controlled by a scanning signal SCAN applied thereto through a gate line.

The switching transistor SWT is turned-on by the scanning signal SCAN to deliver a data voltage Vdata, supplied through the data line DL, to the second node N2 of the driving transistor DRT.

The storage capacitor Cstg is electrically connected between the first node N1 and the second node N2 of the driving transistor DRT.

The storage capacitor Cstg may be an internal capacitor formed between the first node N1 and the second node N2 of the driving transistor DRT, i.e. a parasitic capacitor (e.g. Cgs or Cgd), or an external capacitor intentionally designed to be disposed outside of the driving transistor DRT.

In the display device 100, circuit elements, such as the OLED and the driving transistor DRT, may be degraded along with the lapse of driving time.

Thus, unique characteristic values (e.g. a threshold voltage or mobility) of the circuit elements, such as the OLED and driving transistor DRT, may change. Such changes in the characteristic values of the circuit elements may change the luminance of the corresponding subpixel SP. In addition, the degrees of change in the characteristic values of the circuit elements may differ depending on the degrees of degradation of the circuit elements.

Herein, the characteristic values of the circuit elements (hereinafter referred to as "subpixel characteristic values") may include, for example, the threshold voltage and mobility of the driving transistor DRT, or in some cases, may include the threshold voltage of the OLED.

The display device 100 has a sensing function to sense characteristic values or amounts of change in the characteristics of the subpixels SP and a compensation function to compensate for changes in luminance of the subpixels SP and differences in luminance among the subpixels SP using the result of sensing.

To compensate for the characteristic values or amounts of change in the characteristics of the subpixels SP, the display device 100 includes a subpixel structure suitable for the compensation and a compensation circuit including sensing and compensation components.

Referring to FIG. 2, each of the subpixels SP disposed on the panel 110 further includes, for example, a sensing transistor SENT, in addition to the OLED, the driving transistor DRT, the switching transistor SWT, and the storage capacitor Cstg.

Referring to FIG. 2, the sensing transistor SENT is electrically connected between the first node N1 of the driving transistor DRT and a sensing line SL through which a reference voltage Vref is supplied, and is controlled by a sensing signal SENSE, i.e. a type of a scanning signal, applied thereto through a gate node.

The sensing transistor SENT is turned on by the sensing signal SENSE to apply the reference voltage Vref, supplied through the sensing line SL, to the first node N1 of the driving transistor DRT.

In addition, the sensing transistor SENT may be used as one of voltage sensing paths for the first node N1 of the driving transistor DRT.

The characteristic sensing circuit 140 receives a voltage or a current formed on the first node N1, i.e. a source node, of the driving transistor DRT as a characteristic sensing signal to sense a characteristic value of the subpixel SP using the received voltage or current.

Figure 3A:
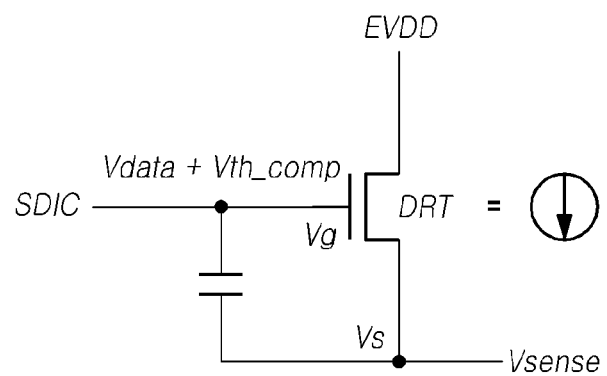
FIG. 3A and FIG. 3B are a circuit diagram and a graph illustrating a characteristic sensing circuit sensing the mobility of the driving transistor using a source node voltage of the driving transistor.
Figure 3B:
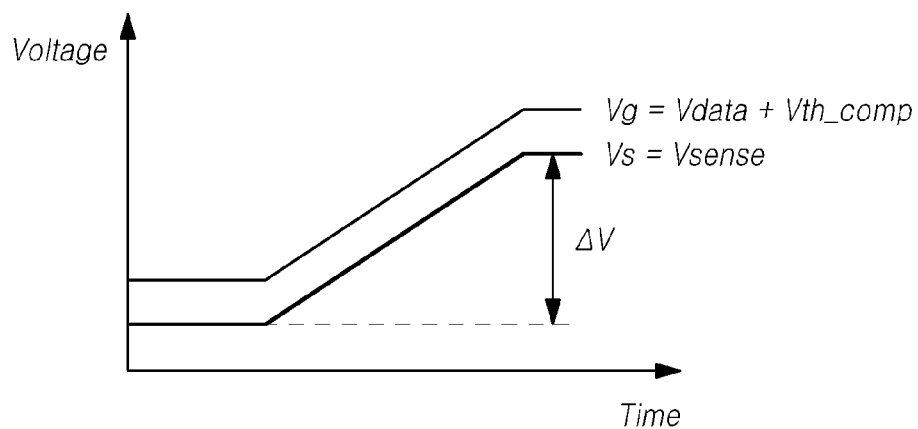

FIG. 3A and FIG. 3B are a circuit diagram and a graph illustrating a characteristic sensing circuit sensing the mobility of the driving transistor using a source node voltage of the driving transistor.

When sensing the mobility, a reference voltage Vref is supplied to the source node of the driving transistor DRT, and the gate node is initialized using a data voltage Vdata+ Vth_comp for mobility sensing, where Vth_comp is a voltage added by threshold voltage compensation performed prior to mobility sensing.

Afterwards, both the source node and the gate node of the driving transistor DRT are floated, and both a source node voltage Vs and a gate node voltage Vg of the driving transistor DRT are increased.

Here, a rate at which the source node voltage Vs increases (i.e. an amount of change in voltage over time) indicates a current capability, i.e. mobility, of the driving transistor DRT. The greater the current capability (mobility) is, the more sharply the source node voltage Vs increases.

The characteristic sensing circuit 140 receives the source node voltage Vs using a characteristic sensing signal, which can be converted into digital data to be used in the data voltage compensation.

The characteristic sensing circuit 140 can recognize characteristic values, e.g. a threshold voltage and mobility, of the subpixels SP using characteristic sensing signals and can execute a characteristic compensation using the characteristic sensing signals.

For example, the characteristic sensing circuit 140 recognizes amounts of change in mobility or differences in mobility per subpixels, calculates compensation values to compensate for the amounts of change in mobility or differences in mobility, and then converts image data using the calculated compensation values.

In addition, the data driver circuit 130 supplies data voltages, compensated based on the changed image data, to the subpixels SP.

In addition, when a difference between the characteristic value of any of the subpixels SP and a preset reference value exceeds a predetermined range, the characteristic sensing circuit 140 determines that a touch has been made by the user (i.e. a user touch has been made) to the corresponding subpixel SP and generates coordinate data of the subpixel SP.

FIG. 4 is a schematic view illustrating amounts of change in the characteristics of subpixels in response to a touch made by a user (hereinafter also referred to as a "user touch").

When the user touches the panel 110, body heat of the user is transferred to a specific subpixel SP, so that the characteristics of the subpixel SP may change.

In addition, not only the body heat of the user but also the user touch may change the capacitance of the subpixel SP. For example, the capacitance of the transistor or the storage capacitor in the subpixel SP may be changed. This may consequently cause a change in the characteristics of the subpixel SP.

The characteristic sensing circuit 140 may generate coordinate data of a position touched by the user by detecting the change in the characteristics of the subpixels SP.

In general, the characteristics of a semiconductor device are changed by heat. For example, when heat is applied to a transistor, the threshold voltage or mobility of the transistor changes. The characteristic sensing circuit 140 generates the coordinate data of the position touched by the user by detecting a change in the characteristics of the transistor or the OLED located in the subpixel SP, the change in the characteristics of the transistor or the OLED being caused by the body heat of the user.

Figure 5:
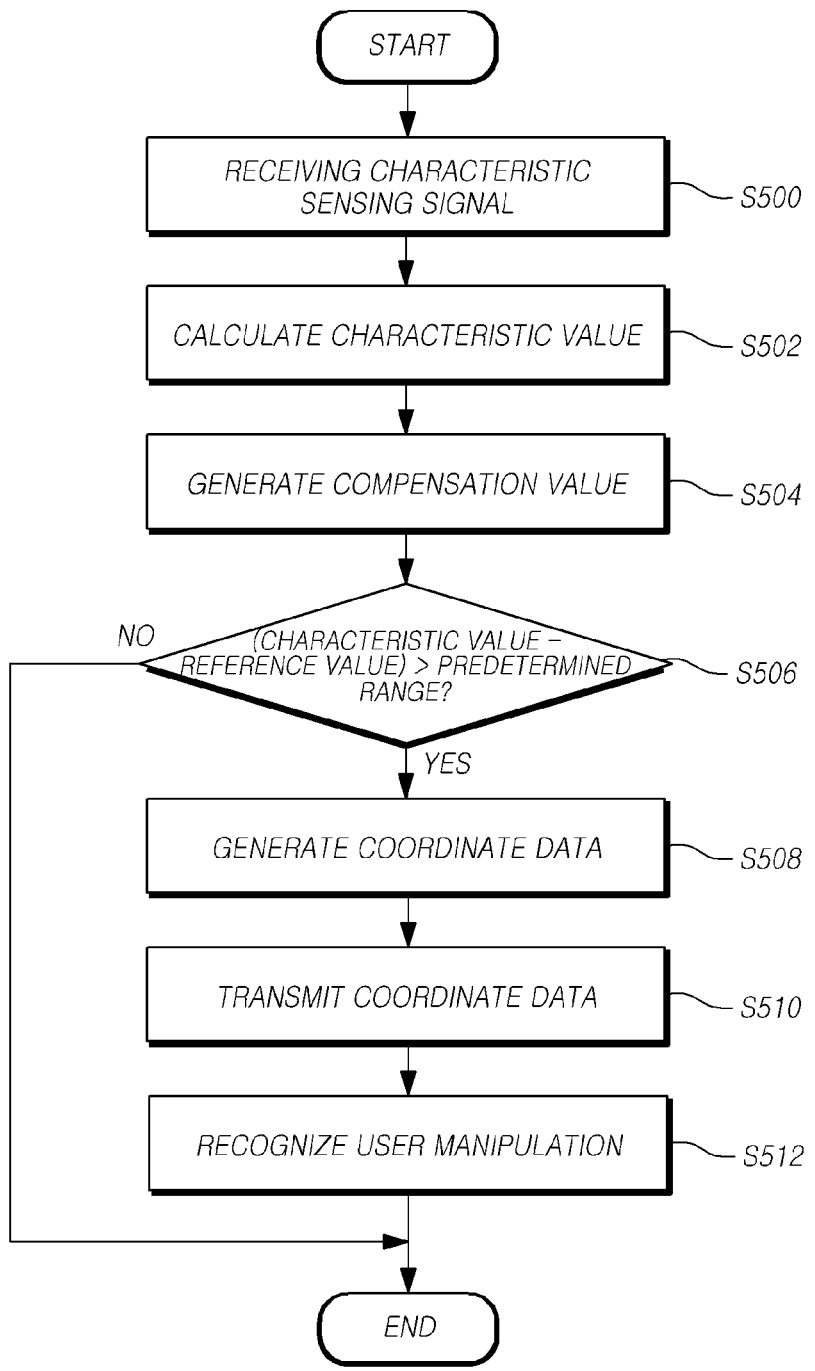
FIG. 5 is a flowchart illustrating an exemplary method of detecting a user manipulation by sensing characteristic values of subpixels.

FIG. 5 is a flowchart illustrating an exemplary method of detecting a user manipulation by sensing characteristic values of subpixels.

Referring to FIG. 5, in S500, the characteristic sensing circuit 140 receives characteristic sensing signals from the subpixels SP through the sensing lines SL. For example, the characteristic sensing circuit 140 receives source node voltages Vs of driving transistors DRT.

In S502, the characteristic sensing circuit 140 calculates characteristic values using the characteristic sensing signals. For example, the characteristic sensing circuit 140 calculates the mobility of the driving transistors DRT using the source node voltages Vs of the driving transistors DRT.

In S504, the characteristic sensing circuit 140 generates compensation values using the sensed characteristic values, so that image data can be converted using the compensation values. Here, the data driver circuit 130 can generate compensated data voltages using the compensated image data and supply the compensated data voltages to the subpixels SP.

When a difference between any of the sensed characteristic values and a preset reference value exceeds a predetermined range, i.e. "Yes" in S506, the characteristic sensing circuit 140 generates coordinate data of the corresponding subpixel SP in S508. In addition, in S510, the characteristic sensing circuit 140 transmits the coordinate data to the host controller 150.

The host controller 150 recognizes a user manipulation based on the received coordinate data in S512, and executes a specific function corresponding to the user manipulation.

The process illustrated in FIG. 5 can be executed for each frame.

Figure 6:
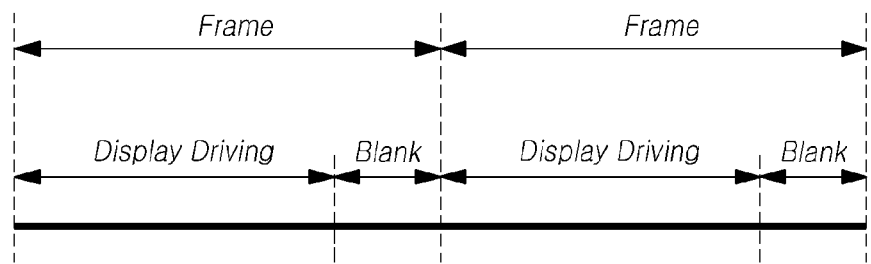
FIG. 6 is a schematic view illustrating a display driving section and a blank section of a frame.

FIG. 6 is a schematic view illustrating a display driving section and a blank section of a frame.

An image displayed on the panel 110 is converted frame by frame. In the display driving section of each frame, the data driver circuit 130 updates an image to be displayed on the panel 110 by supplying the subpixels SP with data voltages converted from image data.

Each frame may include a blank section in which a data voltage is not updated. The characteristic sensing circuit 140 can sense characteristic values of the subpixels SP in the blank section.

Since the blank section is shorter than the display driving section, the characteristic sensing circuit 140 may not sense characteristic values of the entirety of the subpixels SP located on the panel 110. Thus, the characteristic sensing circuit 140 may sense characteristic values of specific subpixels among the subpixels SP in a single frame.

Figure 7:
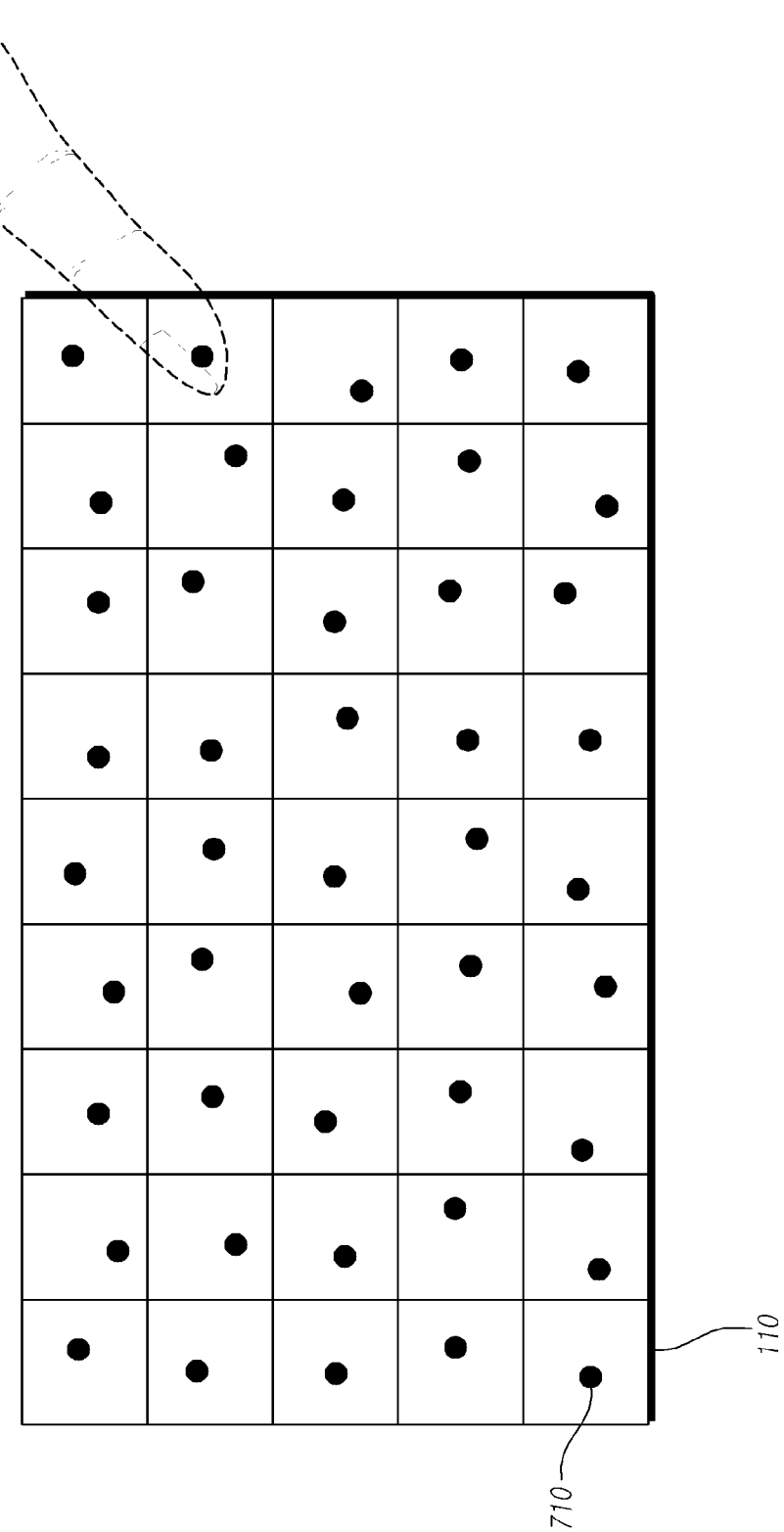
FIG. 7 is a schematic view illustrating the characteristic sensing circuit sensing the characteristic values of specific subpixels selected from the number of subpixels.

FIG. 7 is a schematic view illustrating the characteristic sensing circuit sensing the characteristic values of specific subpixels selected from the number of subpixels.

Referring to FIG. 7, the characteristic sensing circuit 140 can sense characteristic values of specific subpixels 710 on the panel 110 in a single frame.

The specific subpixels 710 may be distributed on the panel 110 to be stochastically uniform. In some embodiments, to increase the uniformity of distribution, the panel 110 may be divided into a plurality of areas, and specific subpixels may be selected from each of the divided areas, randomly or according to a predetermined rule.

The user touch is generally made by a body portion of the user, such as a finger, a wide area of which touches the panel. Thus, the characteristic sensing circuit 140 can recognize a user touch by sensing characteristic values of one or more subpixels SP located in the area touched by the user without sensing the characteristic values of the entirety of the subpixels SP in every frame.

In addition, the user touch is maintained for a longer time than the duration of the frame. Thus, even in the case that there are no subpixels, the characteristic values of which are sensed in one frame, in the area touched by the user, it is highly probable that the characteristic sensing circuit 140 will sense the characteristic values of one or more subpixels SP in another frame.

When the coordinate data generated by the characteristic sensing circuit 140 is transmitted to the host controller 150, the host controller 150 performs a preset specific function depending on coordinate values included in the coordinate data.

In this case, the host controller 150 has specific functions matched to specific areas, and when coordinate data corresponding to a specific area is received, executes a specific function matched to the specific area. The host controller 150 recognizes a user manipulation only for coordinate data in a predetermined area while neglecting coordinate data beyond the predetermined area.

The host controller 150 transmits image data including a guiding message to the data driver circuit 130 to notify the user that the specific functions are matched to the specific areas.

Figure 8:
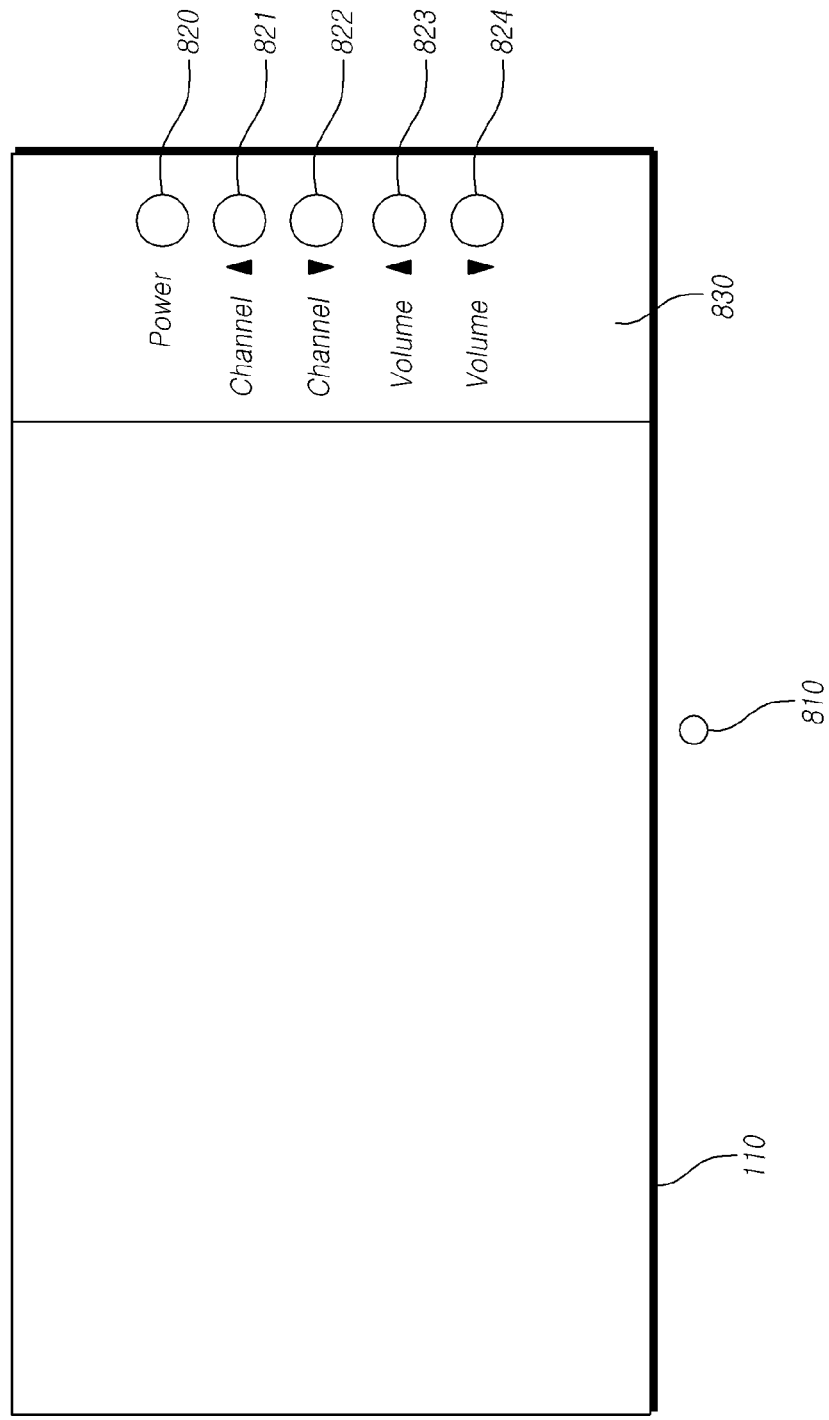
FIG. 8 is a schematic view illustrating a guiding image displayed on the panel.

FIG. 8 is a schematic view illustrating a guiding image displayed on the panel.

Referring to FIG. 8, a guiding image is displayed on a first area 830 adjacent to the right edge of the panel 110.

The guiding image includes a guide message and manipulation area images 820, 821, 822, 823, and 824. The manipulation area images 820 to 824 may be, for example, button images.

The host controller 150 recognizes a user manipulation only for coordinate data in predetermined areas corresponding to the manipulation area images 820 to 824. The host controller 150 processes coordinate data, transmitted from the other areas, as noise data.

The areas corresponding to the manipulation area images 820 to 824 may be matched to specific functions. For example, when the coordinate data of the area corresponding to the first manipulation area image 820 is received, the host controller 150 turns off power. When the coordinate data of the area corresponding to the second manipulation area image 821 is received, the host controller 150 changes the broadcast channel (toward the higher channel number).

The first area 830 on which the guiding image is displayed may be an area of the panel 110 in which less heat is generated. For example, a power management integrated circuit (PMIC) generating a relatively-large amount of heat is not located in the first area 830.

The display device 100 further includes a proximity sensor 810. When the host controller 150 has detected an object to be adjacent using the proximity sensor, the host controller 150 transmits image data, including the guiding image, to the data driver circuit 130.

In addition, the host controller 150 recognizes a user manipulation based on coordinate data only within a period of time in which the object has been detected to be adjacent by the proximity sensor.

Through working in concert with the proximity sensor, the host controller 150 can reduce a possibility of a malfunction that would otherwise occur when the user is not adjacent.

Figure 9:
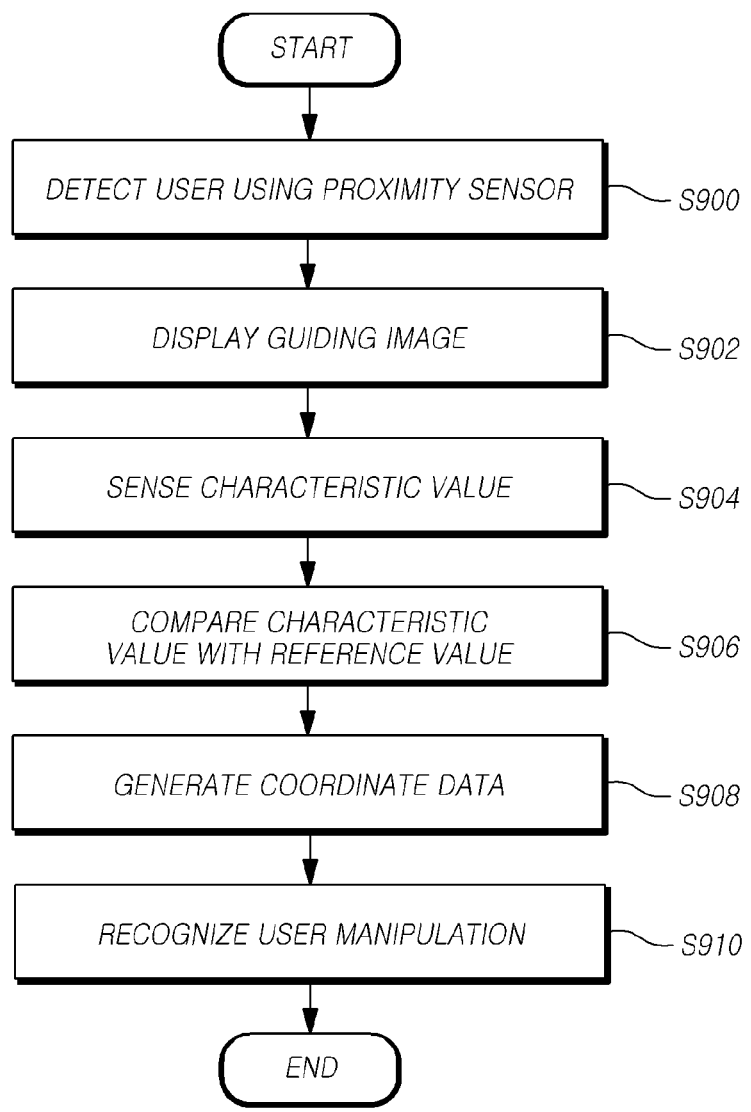
FIG. 9 is a flowchart illustrating an exemplary method of recognizing a user manipulation in concert with the proximity sensor.

FIG. 9 is a flowchart illustrating an exemplary method of recognizing a user manipulation in concert with the proximity sensor.

Referring to FIG. 9, the host controller 150 detects a user to be adjacent by the proximity sensor in S900. After the user has been detected to be adjacent by the proximity sensor, the following processes are executed.

When the user has been detected to be adjacent by the proximity sensor, in S902, the host controller 150 transmits image data including a guiding image to the data driver circuit 130, and the data driver circuit 130 displays the guiding image on the panel 110 by supplying data voltages, converted from the image data, to the corresponding subpixels SP.

In S904, the characteristic sensing circuit 140 senses characteristic values of specific subpixels randomly selected from the subpixels SP in every frame. The characteristic sensing circuit 140 compares the sensed characteristic values with a reference value in S906, and generates coordinate data for a subpixel, a difference between the characteristic value of which and the reference value exceeds a predetermined range, in S908.

In addition, in S910, the host controller 150 recognizes a user manipulation using the coordinate data.

The characteristic sensing circuit 140 that has been described with reference to FIG. 1 to FIG. 9 is not limited to a specific integrated circuit (IC) or a specific circuit but may be embodied as a various forms of hardware. For example, the characteristic sensing circuit 140 may be embodied as a circuit separately from the data driver circuit 130 or may be embodied as a form sharing a portion of the circuit and the processor with the data driver circuit 130. In another example, specific functions of the characteristic sensing circuit 140 may be integrated with the data driver circuit 130 to form a data driver, while the other functions of the characteristic sensing circuit 140 may be integrated with a timing controller.

Figure 10:
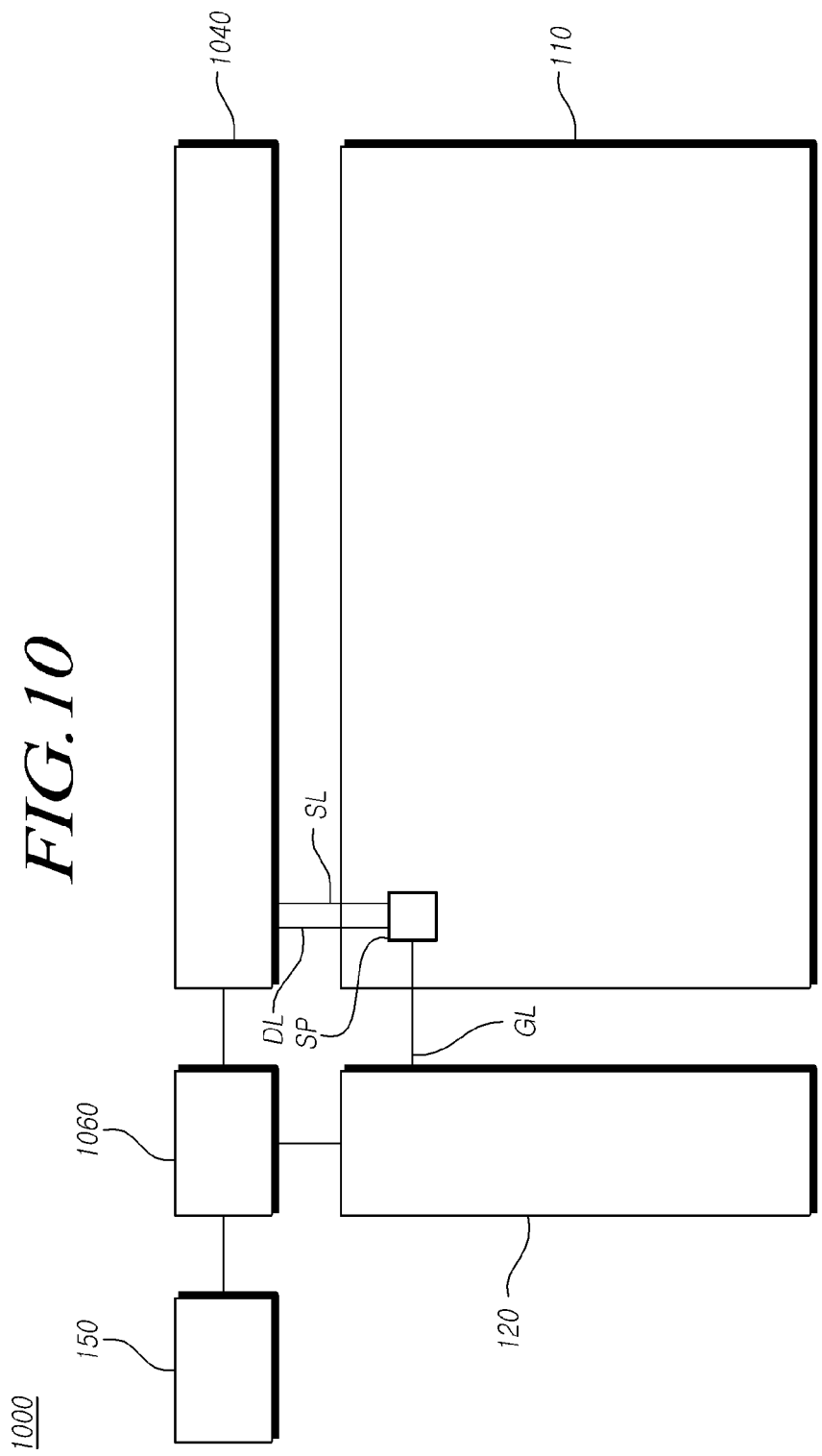
FIG. 10 is a configuration view illustrating a display device according to another aspect of the present disclosure.
Figure 11:
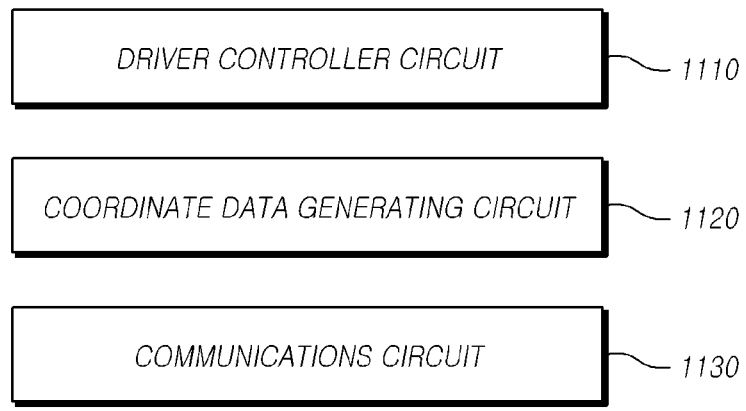
FIG. 11 is a detailed configuration view illustrating the timing controller illustrated in FIG. 10.

FIG. 10 is a configuration view illustrating a display device according to another aspect of the present disclosure, and FIG. 11 is a detailed configuration view illustrating a timing controller illustrated in FIG. 10.

Referring to FIG. 10, the display device 1000 includes a panel 110, a gate driver circuit 120, a data driver 1040, a timing controller 1060, and a host controller 150.

The data driver circuit 1040 can execute all functions of the data driver circuit 130 that have been described with reference to FIG. 1.

In addition, the data driver 1040 receives characteristic sensing signals of subpixels SP through sensing lines SL.

The data driver circuit 1040 converts the received characteristic sensing signals into digital signals and transmits the digital signals to the timing controller 1060.

Referring to FIG. 11, the timing controller 1060 includes a driver controller 1110, a coordinate data generating circuit 1120, and a communications circuit 1130.

The driver controller 1110 controls the gate driver circuit 120 and the data driver circuit 1040 by supplying timing signals to the driver circuit 120 and the data driver circuit 1040.

In addition, the coordinate data generating circuit 1120 measures the characteristic values of the subpixels SP based on the characteristic sensing signals received from the data driver circuit 1040 and compares the characteristic values of the subpixels SP with a predetermined reference value. The coordinate data generating circuit 1120 generates coordinate data for specific subpixels, a difference between the characteristic values of which and the reference value exceeds a predetermined range.

The communications circuit 1130 is a component transmitting and receiving information to and from the other components. The communications circuit 1130 receives the characteristic sensing signals from the data driver circuit 1040 and transmits the coordinate data to the host controller 150.

In addition, the communications circuit 1130 receives a set value from the host controller 150 and delivers the set value to the coordinate data generating circuit 1120.

The coordinate data generating circuit 1120 adjusts the predetermined range depending on the set value received from the host controller 150, wherein the coordinate data is generated based on the predetermined range. For example, the user can set the sensitivity of user manipulation recognition, and the host controller 150 transmits the set value of the predetermined range, determined based on the sensitivity of user manipulation recognition set by the user, to the timing controller 1060. In addition, the coordinate data generating circuit 1120 of the timing controller 1060 adjusts the predetermined range depending on the set value, wherein the coordinate data is generated based on the predetermined range.

According to the aspects as set forth above, it is possible to detect a user manipulation using a touch made by a user to a display panel in place of using a user control button physically disposed on a display device. In addition, according to the present disclosure, it is possible to detect a touch made by a user to a display panel without including a touch panel.

It will be understood that the terms "comprise," "include," "have," and any variations thereof used herein are intended to cover a non-exclusive inclusion unless explicitly described to the contrary. Unless otherwise defined, all terms including technical and scientific terms used herein have the same meaning as commonly understood by a person skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing descriptions and the accompanying drawings have been presented in order to explain the certain principles of the present disclosure. A person skilled in the art to which the disclosure relates could make many modifications and variations by combining, dividing, substituting for, or changing the elements without departing from the principle of the disclosure. The foregoing aspects disclosed herein shall be interpreted as illustrative only but not as limitative of the principle and scope of the disclosure. It should be understood that the scope of the disclosure shall be defined by the appended claims and all of their equivalents fall within the scope of the disclosure.

What is claimed is:

1. A display device comprising:
   a panel on which a plurality of subpixels are disposed;
   a characteristic sensing circuit receiving a characteristic sensing signal corresponding to a voltage or a current between a gate and a source/drain of a driving transistor driving an organic light-emitting diode included in each of the plurality of subpixels, sensing a characteristic value of the plurality of subpixels using the characteristic sensing signal, calculating a compensation value to compensate for a change or a difference in the characteristic value, and generating coordinate data of the specific subpixel when a difference between the characteristic value of a specific subpixel among the plurality of subpixels corresponding to the characteristic sensing signal and a reference value exceeds a predetermined range; and a host controller recognizing a user manipulation based on the coordinate data of the specific subpixel, wherein the characteristic value of the plurality of subpixels includes at least one of a threshold voltage and a mobility of the driving transistor included in each of the plurality of subpixels, and wherein the characteristic sensing circuit adjusts the predetermined range in accordance with a set value received from the host controller.

2. The display device according to claim 1, further comprising a data driver circuit supplying data voltages to the plurality of subpixels, wherein the data voltages compensate for amounts of the change or the difference in the characteristic values.

3. The display device according to claim 1, wherein each of the plurality of subpixels further comprises:
a switching transistor supplying a data voltage to a gate node of the driving transistor; and
a storage capacitor connected between a source node or a drain node of the driving transistor and a gate node of the driving transistor,
wherein the characteristic sensing circuit senses the characteristic value using voltages or currents generated on the source node or the drain node of the driving transistor of the plurality of subpixels.

4. The display device according to claim 3, wherein the characteristic value correspond to mobility of the driving transistor.

5. The display device according to claim 1, wherein the characteristic sensing circuit senses the characteristic values of the specific subpixel randomly selected from the plurality of subpixels in every frame.

6. The display device according to claim 5, wherein the characteristic sensing circuit senses the characteristic value in a blank section of the every frame.

7. The display device according to claim 1, wherein the host controller recognizes the user manipulation only when a proximity sensor detects an object to be adjacent.

8. The display device according to claim 1, further comprising a data driver circuit supplying data voltages converted from image data to the plurality of subpixels.

9. The display device according to claim 8, wherein the data driver circuit receives the image data including a guiding image from the host controller when a proximity sensor detects an object to be adjacent.

10. The display device according to claim 8, wherein the guiding image includes a manipulation area image, and the host controller recognizes the user manipulation only for the coordinate data in an area corresponding to the manipulation area image.

11. The display device according to claim 1, wherein the host controller recognizes the user manipulation only for the coordinate data in a predetermined area.

12. The display device according to claim 1, wherein the host controller executes a predetermined function based on coordinate values included in the coordinate data.

13. A display device comprising:
a panel on which a plurality of subpixels, a plurality of data lines, and a plurality of sensing lines are disposed;
a data driver circuit supplying data voltages to the plurality of subpixels through the plurality of data lines and receiving characteristic sensing signals corresponding to a voltage or a current between a gate and a source/drain of a driving transistor driving an organic light-emitting diode included in each of the plurality of subpixels from the plurality of subpixels through the plurality of sensing lines;
a timing controller controlling the data driver circuit using timing signals, sensing a characteristic value of the plurality of subpixels using the characteristic sensing signals, calculating a compensation value to compensate for a change or a difference in the characteristic value, and comparing the characteristic value of the plurality of subpixels corresponding to the characteristic sensing signals with a predetermined reference value, and generating coordinate data for the specific subpixel when a difference between the characteristic value of a specific subpixel among the plurality of subpixels and a reference value exceeds a predetermined range; and a host controller recognizing a user manipulation based on the coordinate data of the specific subpixel, wherein the characteristic value of the plurality of subpixels includes at least one of a threshold voltage and a mobility of the driving transistor included in each of the plurality of subpixels, and wherein the timing controller adjusts the predetermined range in accordance with a set value received from the host controller.

14. The display device according to claim 13, wherein each of the plurality of subpixels further comprises:
a switching transistor supplying a data voltage to a gate node of the driving transistor; and
a storage capacitor connected between a source node or a drain node of the driving transistor and a gate node of the driving transistor,
wherein the characteristic sensing signals are voltages or currents generated on the source nodes or the drain nodes of the driving transistors of the plurality of subpixels.

15. A timing controller comprising:
a driver controller controlling a data driver circuit by transmitting timing signals to the data driver circuit, wherein the data driver circuit supplies data voltages to a plurality of subpixels through a plurality of data lines and receives characteristic sensing signals corresponding to a voltage or a current between a gate and a source/drain of a driving transistor driving an organic light-emitting diode included in each of the plurality of subpixels from the plurality of subpixels through a number of sensing lines;
a coordinate data generator comparing a characteristic value of the plurality of subpixels sensed by using the characteristic sensing signals with a predetermined reference value, and generating coordinate data for the specific subpixel when a difference between the characteristic value of a specific subpixel among the plurality of subpixels and the reference value exceeds a predetermined range; and
a communications circuit receiving the characteristic sensing signals from the data driver circuit and transmitting the coordinate data to a host controller circuit,
wherein the characteristic values are used for calculating a compensation value to compensate for a change or a difference in the characteristic value, wherein the characteristic values of the plurality of subpixels include at least one of a threshold voltage and a mobility of the driving transistor included in each of the plurality of subpixels, and wherein the coordinate data generator adjusts the predetermined range in accordance with a set value received from the host controller circuit.

16. The timing controller according to claim 15, wherein the host controller circuit recognizes a user manipulation based on the coordinate data.

17. The timing controller according to claim 16, wherein the host controller circuit recognizes the user manipulation only when a proximity sensor detects an object to be adjacent.

* * * * *